(12) United States Patent
Ogawa

(10) Patent No.: US 8,559,424 B2
(45) Date of Patent: Oct. 15, 2013

(54) DATA COMMUNICATION METHOD AND COMMUNICATION APPARATUS

(75) Inventor: Hitoshi Ogawa, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 345 days.

(21) Appl. No.: 12/770,288

(22) Filed: Apr. 29, 2010

(65) Prior Publication Data
US 2010/0278175 A1 Nov. 4, 2010

(30) Foreign Application Priority Data
Apr. 30, 2009 (JP) ................................. 2009-111331

(51) Int. Cl.
*H04L 12/28* (2006.01)

(52) U.S. Cl.
USPC ........................................................ 370/389

(58) Field of Classification Search
None
See application file for complete search history.

(56) References Cited

U.S. PATENT DOCUMENTS

| | | | | |
|---|---|---|---|---|
| 5,802,302 | A * | 9/1998 | Waclawsky et al. | 709/224 |
| 7,051,132 | B2 * | 5/2006 | Hong | 710/107 |
| 7,212,490 | B1 * | 5/2007 | Kao et al. | 370/222 |
| 7,936,700 | B2 * | 5/2011 | Yamazaki et al. | 370/252 |
| 2002/0118700 | A1 * | 8/2002 | Bruckman | 370/460 |
| 2004/0230726 | A1 * | 11/2004 | Blake et al. | 710/100 |
| 2005/0030961 | A1 * | 2/2005 | Lee et al. | 370/404 |
| 2005/0226265 | A1 | 10/2005 | Takatori | |

FOREIGN PATENT DOCUMENTS

| JP | 10-313331 A | 11/1998 |
|---|---|---|
| WO | 2004/095779 A1 | 11/2004 |

OTHER PUBLICATIONS

S. Shah, et al., "Extreme Networks' Ethernet Automatic Protection Switching (EAPS) Version 1", RFC 3619, Network Working Group, The Internet Society, Oct. 2003.*

* cited by examiner

*Primary Examiner* — Dang Ton
*Assistant Examiner* — Ronald H Davis
(74) *Attorney, Agent, or Firm* — Arent Fox LLP

(57) ABSTRACT

A data communication method in a network including a plurality of communication apparatuses connected in the form of a ring, the network being logically broken at a given position, the method comprising: calculating transmission time between a sending apparatus and a granting apparatus granting control of a bus to the sending apparatus in each of a first communication environment in which data is transferred in a first direction on the network and a second communication environment in which data is transferred in a second direction different from the first direction; and changing the transfer direction on the network for each sending apparatus to a transfer direction that provides shorter transmission time on the basis of the calculated transmission times and performing data transfer.

13 Claims, 12 Drawing Sheets

FIG.3

| node ID | 0 | 1 | 2 | 3 | 4 | 5 | 6 | 7 | 8 | 9 | 10 |
|---|---|---|---|---|---|---|---|---|---|---|---|
| sending apparatus | ○ | ○ | × | × | ○ | × | × | × | ○ | ○ | × |
| clockwise transfer time | 10 | 820 | - | - | 3250 | - | - | - | 5230 | 5640 | - |
| counterclockwise transfer time | 6110 | 5300 | - | - | 2870 | - | - | - | 830 | 420 | - |

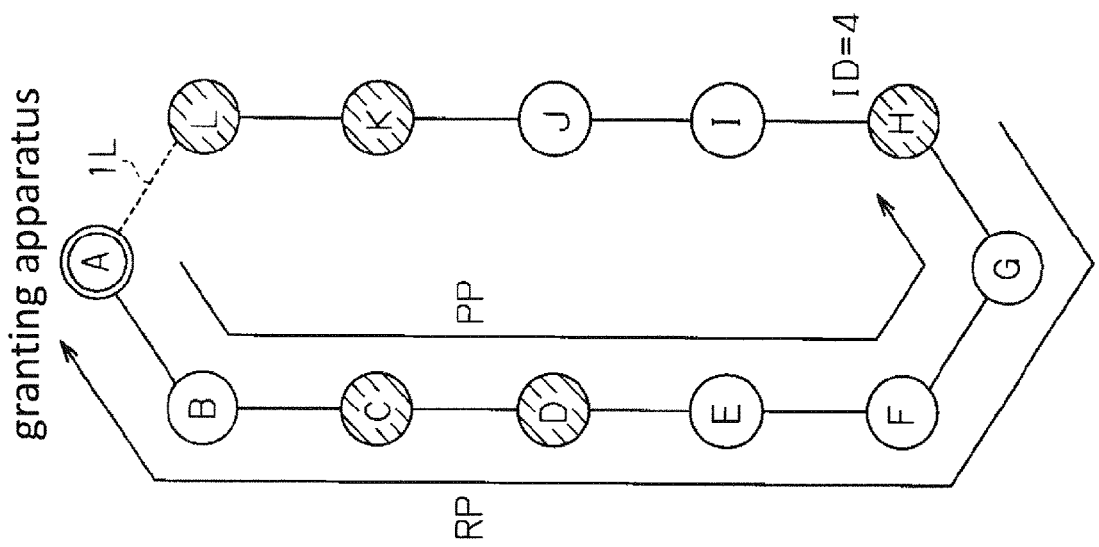
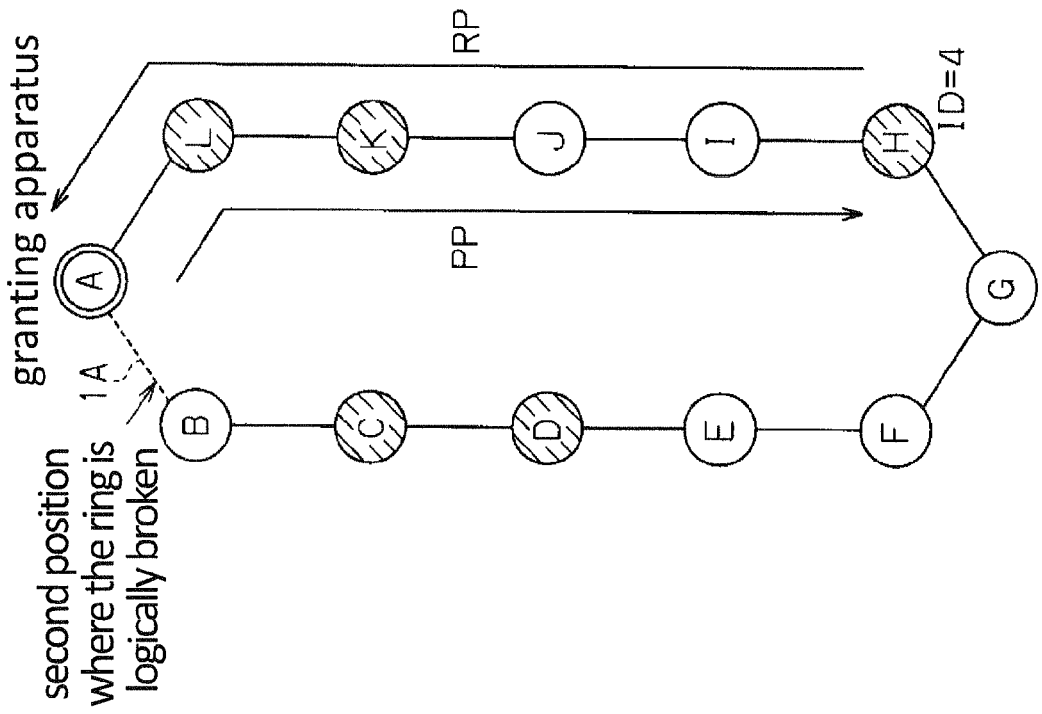

FIG.6B
granting apparatus

FIG.6A
granting apparatus sending apparatus

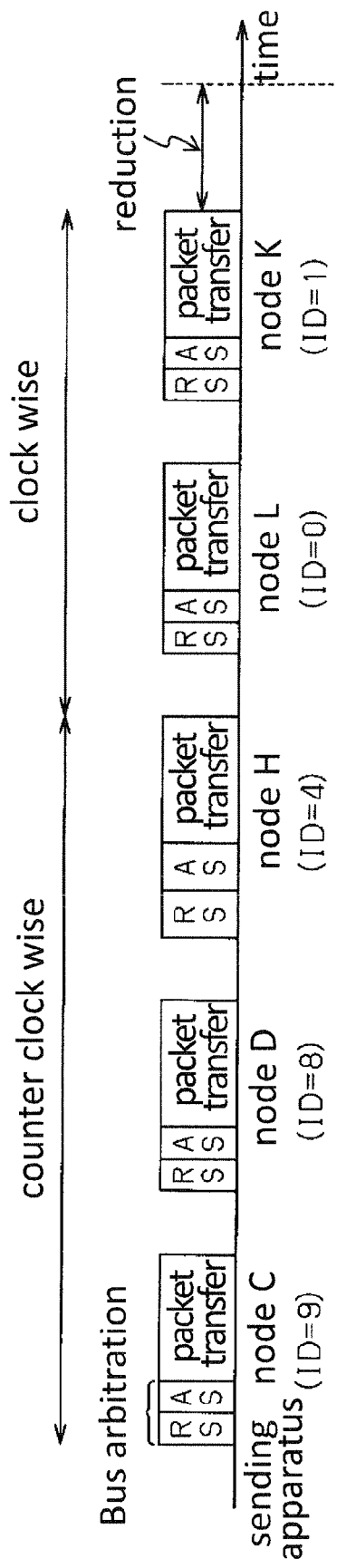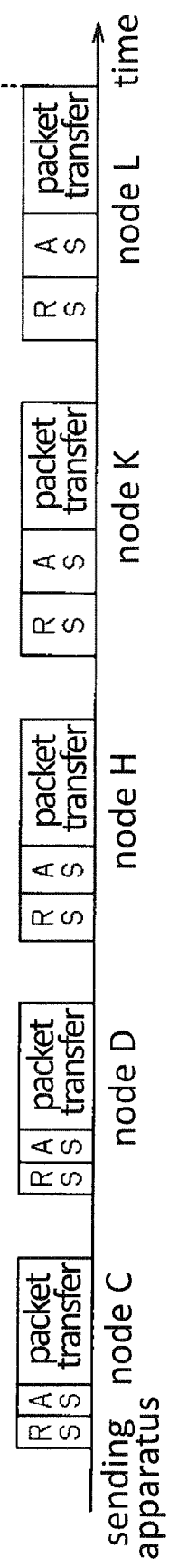

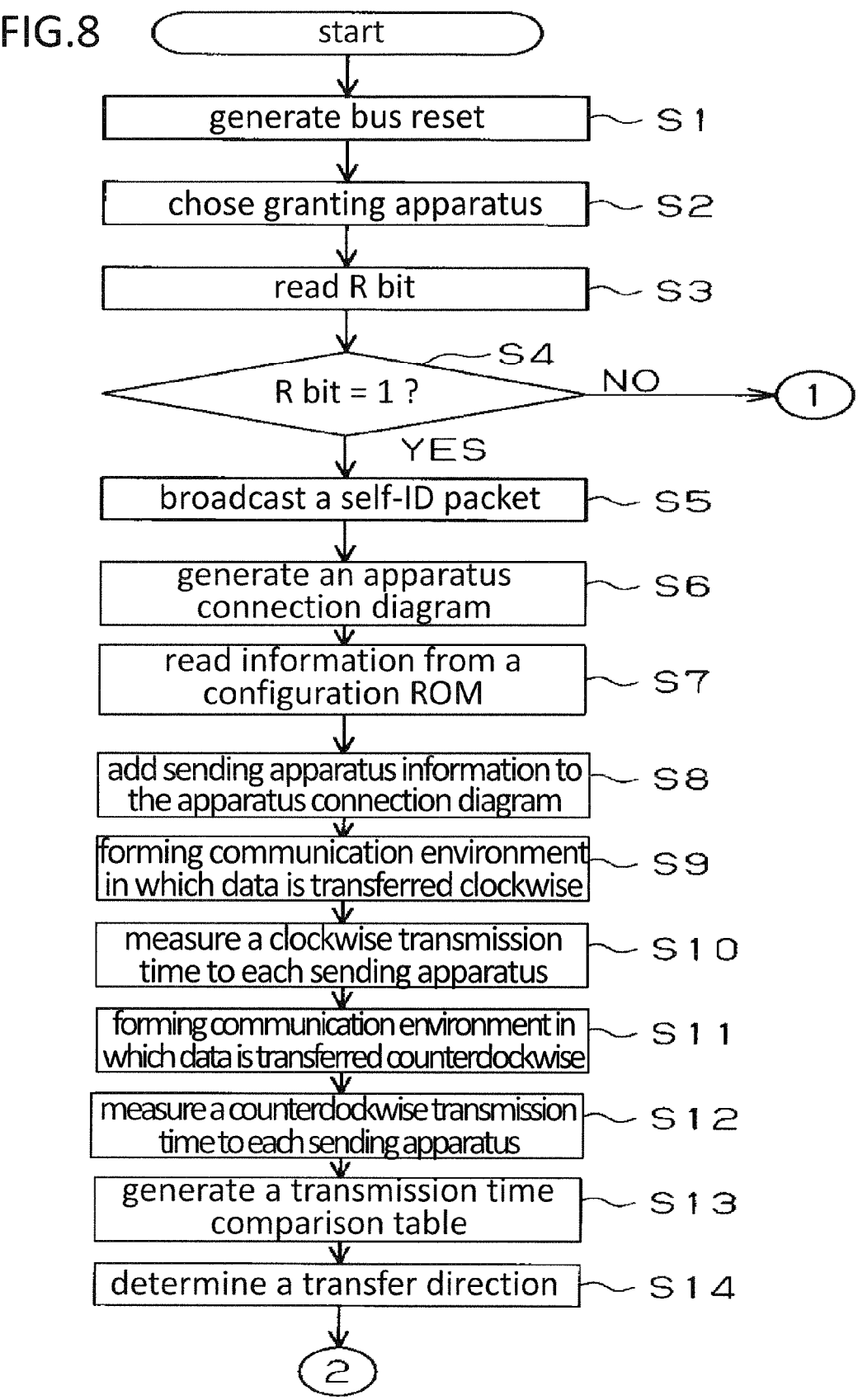

FIG.10

| node ID | 0 | 1 | 2 | 3 | 4 | 5 | 6 | 7 | 8 | 9 | 10 |
|---|---|---|---|---|---|---|---|---|---|---|---|
| sending apparatus | ○ | ○ | × | × | ○ | × | × | × | ○ | ○ | × |
| sending apparatus | 400 | 400 | 400 | 400 | 400 | 200 | 200 | 200 | 200 | 200 | 200 |
| clockwise transfer time | 5 | 410 | 815 | 1220 | 1625 | 2000 | 2205 | 2410 | 2615 | 2820 | 3025 |
| counterclockwise transfer time | 3055 | 2650 | 2245 | 1840 | 1435 | 1030 | 825 | 620 | 415 | 210 | 5 |

FIG.12

| node ID | 0 | 1 | 2 | 3 | 4 | 5 | 6 | 7 | 8 | 9 | 10 | Sum of repeat counts |
|---|---|---|---|---|---|---|---|---|---|---|---|---|
| sending apparatus | ○ | ○ | × | × | ○ | × | × | × | ○ | ○ | × | 16 |
| clockwise transfer time | 0 | 2 | – | – | 8 | – | – | – | 16 | 18 | – | |
| counterclockwise transfer time | 20 | 18 | – | – | 12 | – | – | – | 4 | 2 | – | |

DATA COMMUNICATION METHOD AND COMMUNICATION APPARATUS

CROSS REFERENCE TO RELATED APPLICATION

This application is based upon and claims the benefit of priority from the prior Japanese Patent Application NO. 2009-111331 filed on Apr. 30, 2009, the entire contents of which are incorporated herein by reference.

FIELD

The embodiments discussed herein are related to a data communication method and a data communication apparatus.

BACKGROUND

IDB-1394 standard is suited for an in-vehicle multimedia network that has a bandwidth sufficient for multiplex transmission of digital video and audio data and is capable of multiplex transmission of video and audio.

In the IDB-1394 network, apparatuses connected onto the network may act as a granting apparatus (root node) and the apparatuses may be interconnected in any of various topologies such as daisy chain, tree, and ring.

Related are is disclosed in Japanese Laid-Open Publication No. 10-313331.

SUMMARY

According to one aspect of the embodiments, a data communication method disclosed herein includes: calculating transmission time between a sending apparatus and a granting apparatus granting control of a bus to the sending apparatus in each of a first communication environment in which data is transferred in a first direction on the network and a second communication environment in which data is transferred in a second direction different from the first direction; and changing the transfer direction on the network for each sending apparatus to a transfer direction that provides shorter transmission time on the basis of the calculated transmission times and performing data transfer.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

BRIEF DESCRIPTION OF THE DRAWINGS

FIG. 3 illustrates a comparison table for comparing transmission times in an embodiment of the present invention;

FIGS. 5A and 5B are diagrams illustrating a process for measuring transmission time;

FIGS. 6A and 6B are diagrams illustrating packet transfer;

FIG. 7A is a diagram illustrating packet transfer according to the present embodiment; FIG. 7B is a diagram illustrating conventional packet transfer;

FIG. 8 is a flowchart illustrating an operation of a network system;

FIG. 10 illustrates a comparison table for comparing transmission times in a variation;

FIG. 12 illustrates a comparison table for comparing repeat counts in a variation.

DESCRIPTION OF EMBODIMENTS

Figure 1:
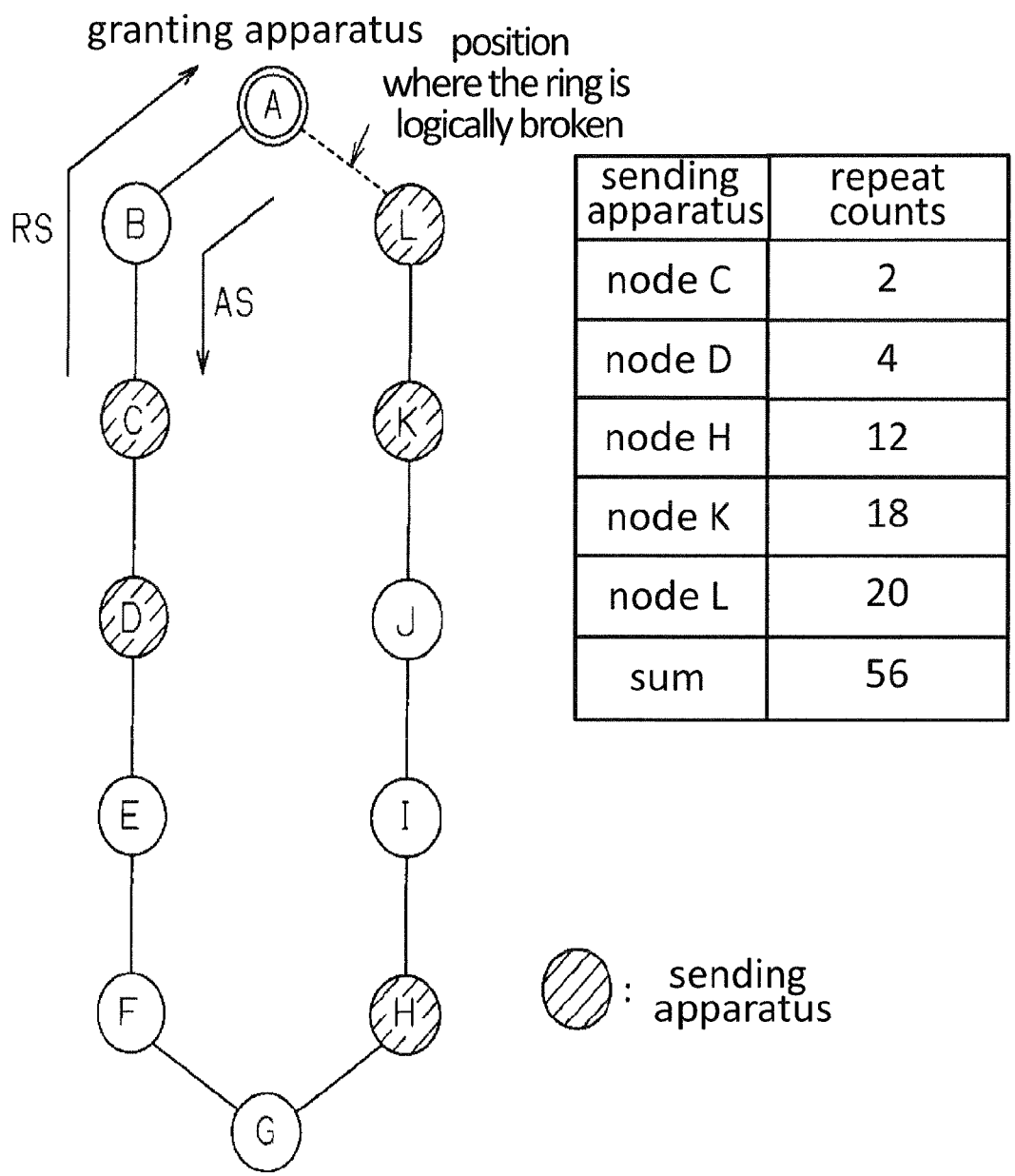
FIG. 1 is an exemplary ring network system.

The IDB-1394 network requests bus arbitration for allowing an apparatus to gain control of a bus prior to each attempt to transfer actual packet data. In the bus arbitration, a request signal RS and a grant signal AS are sent and received between a sending apparatus (transmission requesting apparatus) attempting to transfer packets and a granting apparatus A as illustrated in FIG. 1. The time requested for the bus arbitration depends on the positional relationship between the sending apparatus and the granting apparatus. However, the granting apparatus and the logical break point (see the dashed line in FIG. 1) in the ring topology may be determined randomly or automatically by the order in which the apparatuses are powered on and the connection modes of the apparatuses. Accordingly, the bus arbitration may take much time, squeezing the bandwidth requested for transferring intended packet data. For example, as illustrated in FIG. 1, if a port of the granting apparatus A is logically disconnected, the logical connection distance from a sending apparatus that is physically at a close distance to the granting apparatus A, such as sending apparatuses K and L, may increase. It may take much time to send and receive a request signal RS and a grant signal AS between the sending apparatuses K, L and the granting apparatus A.

Figures 4A, 4B, 4C:
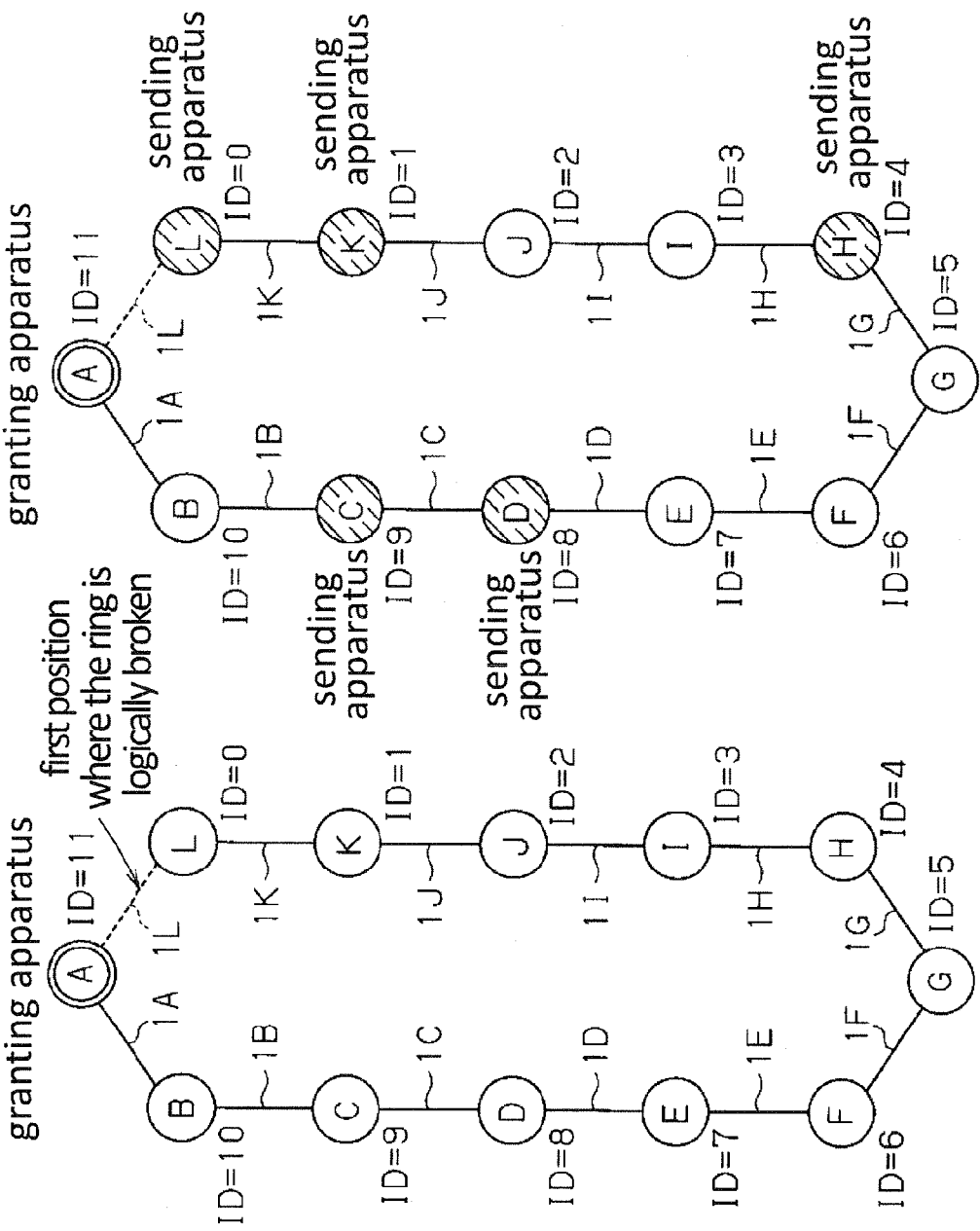
FIGS. 4A to 4C are diagrams illustrating operations of a network system.

FIG. 4A illustrates a network system (topology) conforming to the IDB-1349 standard, which is an in-vehicle serial interface standard.

Multiple nodes A to L are connected on the network system through IDB-1394 bus cables 1A to 1L. Specifically, nodes A, B, C, D, E, F, G, H, I, J, K and L are connected in series in this order through bus cables 1A to 1K, respectively. Node L is connected to node A through bus cable 1L. In the topology thus configured, nodes A to L and bus cables 1A to 1L form a ring (loop).

Nodes A to L are a generic name of connection points of apparatuses such as a navigation apparatus and a rear display. Here, nodes C, D, H, K and L functions as sending apparatuses, such as a navigation apparatus, that perform packet transfer (data transmission) (see FIG. 4C).

An internal configuration of node A will be described with reference to FIG. 2. Nodes B to L have configurations similar to that of node A and therefore description of the nodes B to L will be omitted.

Figure 2:
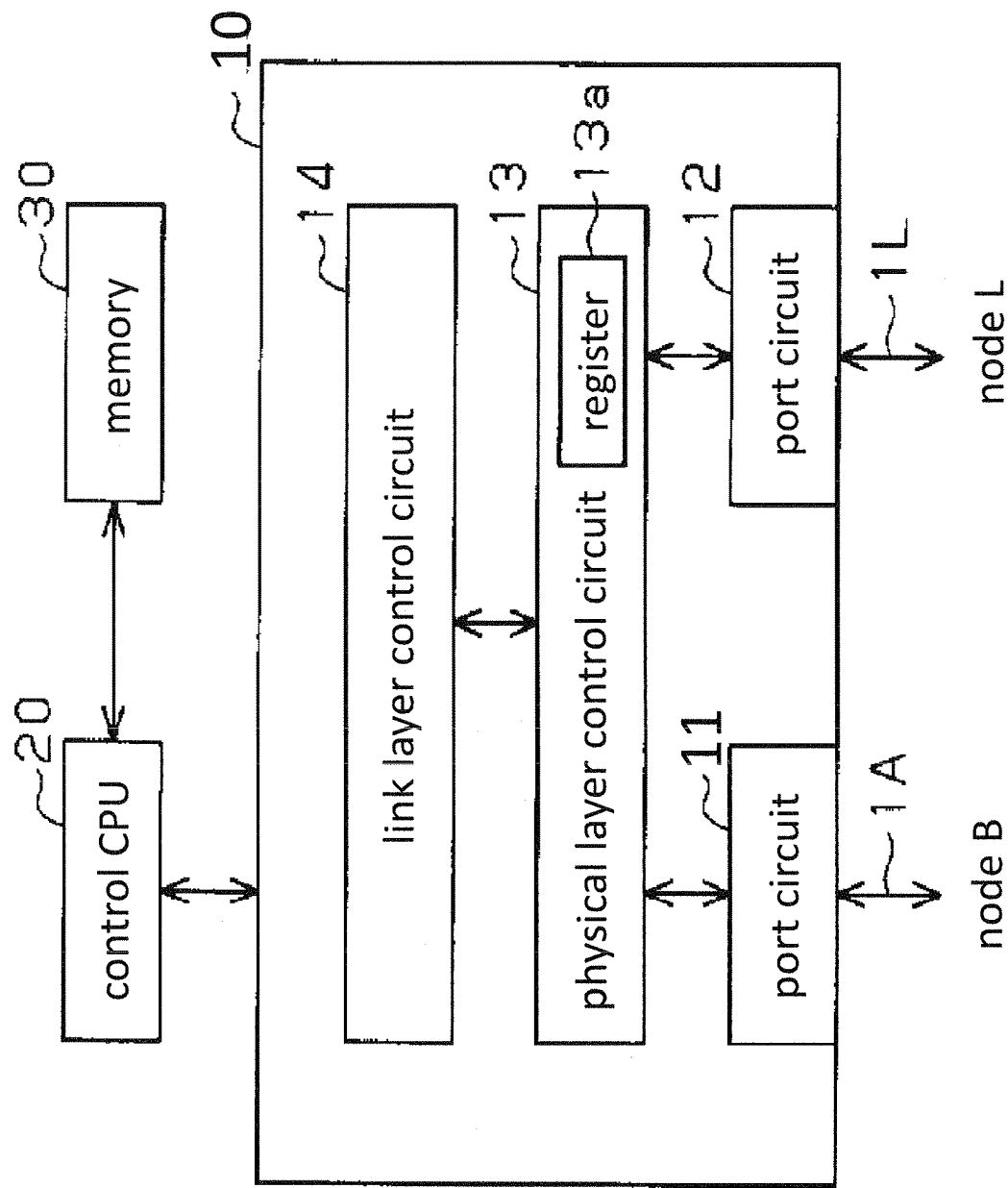
FIG. 2 is a block diagram illustrating an exemplary internal configuration of a node.

As illustrated in FIG. 2, node A includes an in-vehicle 1394 controller (IPC) 10, a control CPU 20 which controls the IPC 10, and a memory 30. The IPC 10 includes port circuits 11, 12, a physical layer control circuit 13, and a link layer control circuit 14.

The port circuit 11 is connected to node B through bus cable 1A; port circuit 12 is connected to node L through bus cable 1L. The port circuits 11 and 12 convert electrical signals received from another node to electrical signals to be handled in the node apparatus and output the electrical signals to the physical layer control circuit 13. The port circuits 11 and 12 also convert electrical signals from the physical layer control circuit 13 to electrical signals conforming to the IDB-1394 standard and send the electrical signals to another node.

The physical layer control circuit 13 performs processing such as bus status monitoring, bus configuration after a bus reset, speed signaling, and bus arbitration. During bus configuration, information concerning the buses of all nodes in the topology is initialized, a granting apparatus (root node) is determined, the node ID of each node is determined, and self-ID packets for notifying the node IDs are sent. The physical layer control circuit 13 converts electrical signals input from the port circuits 11 and 12 to logical signals handled by the link layer control circuit 14 and outputs the electrical signals to the link layer control circuit 14. The physical layer control circuit 13 also converts logical signals input from the link layer control circuit 14 to electrical signals and outputs the electrical signals to the port circuits 11 and 12.

The physical layer control circuit 13 includes a register (physical layer register) 13*a*. The register 13*a* contains bits such as an R bit indicating whether or not the own node is a granting apparatus and a Delay bit specifying repeat time for the own node.

The link layer control circuit 14 determines, on the basis of the header section of a logical signal (packet data) input from the physical layer control circuit 13, whether or not the packet is directed to the own node. If the packet data received is directed to the own node, the link layer control circuit 14 performs cyclic redundancy check (CRC) or other check on the packet data and then provides the data section of the packet data to a host apparatus such as a host computer. On the other hand, if the received packet data is not directed to the own node, the link layer control circuit 14 transfers (repeats) the packet data to another node other than the node that has sent the packet data. Specifically, when data that is not directed to node A itself is received, for example when data is transferred from nodes B to nodes L or from L to B, the IPC 10 (link layer control circuit 14) of node A relays, or repeats, the data.

The link layer control circuit 14 generates packet data conforming to the IDB-1394 standard on the basis of a data section input from the host apparatus such as the host computer and outputs the packet data (logical signal) to the physical layer control circuit 13. Specifically, the link layer control circuit 14 adds a header section, a header CRC, and a data CRC to the data section input from the host apparatus such as the host computer to generate packet data.

The control CPU 20 centrally controls the IPC 10. The control CPU 20 performs the following processing when a ring topology is built and node A itself is the granting apparatus. The control CPU 20 generates an apparatus connection diagram indicating a connection mode of each node on the basis of the self-ID packet sent from the node (that is, the control CPU 20 acts as apparatus connection diagram generation means). The control CPU 20 reads information from configuration ROMs of the nodes other than the own node A and acquires information (positional information) about sending apparatuses (that is, the control CPU 20 acts as acquisition means). The control CPU 20 calculates (measures) transmission time (time to arrival of a packet) from the own node to each sending apparatus in more than one communication environment (connection mode) (that is, the control CPU 20 acts as calculation means). The control CPU 20 generates a comparison table for comparing transmission times as illustrated in FIG. 3 based on the calculated transmission times (the control CPU 20 acts as comparison table generation means). Based on the comparison table, the control CPU 20 selects a transfer direction for each sending apparatus so that the transmission time for the sending device is minimized (the control CPU 20 acts as selection means). When packet transfer is performed, the control CPU 20 disables one of the port circuits 11 and 12 of node A itself to change a logical break point on the basis of the information indicating the selected transfer direction, thereby switching the transfer direction on the network (the control CPU 20 acts as switching means).

An operation of the network system configured as described above (in particular an operation of node A which acts as a granting apparatus) will be described with reference to FIGS. 2 through 8 and thereby describes the functions of the components in further detail.

Upon power-on of nodes A to L depicted in FIG. 4A, the IPC 10 of each of nodes A to L performs bus configuration. Specifically, first a bus reset is generated in a bus initialization phase (step S1 of FIG. 8). As a result, information concerning the topology on all nodes is deleted. After completion of the bus initialization, a ring topology illustrated in FIG. 4A is formed in an identification phase. Once the ring topology has formed in this way, the ring is logically broken at one position that is randomly (automatically) determined depending on the order in which the apparatuses have been powered on and the connection modes of the apparatuses, as illustrated in FIG. 4B (in this example, the position between nodes A and L as in the example of the conventional network). Then, any of the nodes is chosen to be a granting apparatus (root node) on the basis of the power on sequence and the connection modes (step S2). Here, node A is chosen to be the granting apparatus.

Then, the control CPU 20 of each of the nodes A to L reads the R bit from the register 13*a* of the own node (step S3) and determines whether the R bit is "1" or not (step S4). With this, the control CPU 20 determines whether or not the own node is the granting apparatus. Here, since the R bit is "1", the control CPU 20 of node A determines that own node A is the granting apparatus (YES at step S4) and proceeds to step S5. Since the R bit on the other nodes B to L are "0", the control CPUs 20 of node B to L determines that the own nodes are not the granting node (NO at step S4) and exit the process after step S5.

At step S5 (self-identification phase), the node ID of each of nodes A to L is determined and a self-ID packet including the node ID is broadcast from each of nodes A to L. It is assumed here that node IDs 0, 1, 2, 3, 4, 5, 6, 7, 8, 9, 10 and 11 are assigned to nodes L, K, J, I, H, G, F, E, D, C, B, and A, respectively, as illustrated in FIG. 4B. Steps S6 through S14 described below are performed by the node (in this example, node A) chosen to be the granting apparatus on the ring network.

The control CPU 20 of the granting apparatus A receives the self-ID packets from the other nodes to acquire the node IDs and connecting locations (connection modes) of the nodes and generate an apparatus connection diagram as depicted in FIG. 4B (step S6). For example, the control CPU 20 of the granting apparatus A tabulates the connection modes and node ID information of the nodes to generate the apparatus connection diagram as illustrated in FIG. 4B. The control CPU 20 of the granting apparatus A stores the generated apparatus connection diagram in the memory 30.

Then, the control CPU 20 of the granting apparatus A reads information from the configuration ROM on each of nodes B to L other than node A (step S7). Specifically, the granting apparatus A sends a read request packet to the node IDs of the other nodes B to L to read information from the configuration ROMs included in the other nodes. Each configuration ROM contains information such as information unique to the node such as a serial number and/or sending apparatus information indicating that the apparatus is a sending apparatus. Thus, the granting apparatus A may acquire information indicating the types of the other nodes currently connected onto the bus, in particular, information indicating whether the nodes are sending apparatus or not, by reading the items of information. The control CPU 20 of the granting apparatus A then adds the acquired sending apparatus information to the apparatus connection diagram in association with the node IDs of the nodes as depicted in FIG. 4C (step S8). Specifically, the sending apparatus information is added in association with node IDs 0, 1, 4, 8 and 9 in this example. With this, the control CPU 20 of the granting apparatus A may acquire positional information indicating the location of the sending apparatuses. The control CPU 20 of the granting apparatus A stores the apparatus connection diagram to which the sending apparatus information has been added in the memory 30.

Then the control CPU 20 of the granting apparatus A starts a calculation process for calculating time requested for transmission between the own node and each of the sending apparatuses C, D, H, K and L for each connection mode (communication environment) (steps S9 through S12). Specifically, at step S9, the control CPU 20 of the granting apparatus A forcibly disables any of the port circuits of the own node A (here, the port circuit 11 connected to node B) that forms the ring (see FIG. 5A). Since a first logical break point (see the dashed line in FIG. 4B) that has been automatically logically created differs from a second logical break point (see the dashed line in FIG. 5A) that has been logically created by the forcible disablement of the port circuit 11, the topology changes. Accordingly, a bus reset occurs, which cancels at the logical the first logical break point. Consequently, the ring is broken only at the second logical break point. Therefore, only the connection between the granting apparatus A and node B (bus cable 1A) is logically broken and a communication environment is formed in which data is transferred clockwise (in a first direction) from the granting apparatus A to the sending apparatuses C, D, H, K to L in the example.

Then, the control CPU 20 of the granting apparatus A sends a Ping packet PP to all of the sending apparatuses C, D, H, K, and L as a transmission time measuring packet in the clockwise communication environment and measures the clockwise transmission time to each sending apparatus (step S10). Specifically, the control CPU 20 of the granting apparatus A acquires the node IDs associated with the sending apparatus information from the apparatus connection diagram and sends the Ping packet PP to the node IDs. For example, as illustrated in FIG. 5A, when measuring the transmission time to node H, the control CPU 20 of the granting apparatus A sends a Ping packet PP to node ID 4. The Ping packet PP is transferred from the granting apparatus A to the intended node H through nodes L, K, J and I. That is, the Ping packet PP is repeated by nodes L, K, J and I until arriving at the intended node H. Upon receiving the Ping packet, node H sends a response packet RP responding to the Ping packet PP back to the sending granting apparatus A. The control CPU 20 of the granting apparatus A measures the time between the transmission of the Ping packet PP and the arrival of the response packet RP (time to arrival). Here, the clockwise transmission time to node H (with node ID 4) is "3250" (see FIG. 3). The transmission times to the other sending apparatuses are measured in the same way. Here, the clockwise transmission time to nodes L, K, D and C (with node IDs 0, 1, 8 and 9, respectively) are "10", "820", "5230" and "5640", respectively.

Then, at step S11, the control CPU 20 of the granting apparatus A forcibly disables one of the port circuits of the own node A, that is, the port circuit 12, different from the port circuit 11 that has been disabled at step S9 and enables the port circuit 11. The port circuit 12 disabled here is a port circuit that constitutes the ring, like the port circuit 11. As a result, the connection between the granting apparatus A and node L (bus cable 1L) is logically broken and the communication environment is formed in which data is transferred counterclockwise (in a second direction) from the granting apparatus A to the sending apparatuses C, D, H, K and L.

In the counterclockwise communication environment, the control CPU 20 of the granting apparatus A sends a Ping packet PP to all of the sending apparatuses C, D, H, K and L and measures the counterclockwise transmission time to each of the sending apparatuses (step S12). For example, when measuring the transmission time to node H, the control CPU 20 of the granting apparatus A sends a Ping packet PP with node ID 4, as illustrated in FIG. 5B. The Ping packet PP is transferred to the destination node H through nodes B, C, D, E, F and G as depicted in FIG. 5B. Upon receiving the Ping packet PP, node H sends a response packet RP responding to the Ping packet back to the granting apparatus A which has sent the Ping packet PP. The control CPU 20 of the granting apparatus A measures the transmission time between the transmission of the Ping packet PP and the arrival of the response packet RP. Here, the counterclockwise transmission time to node H is "2870" (see FIG. 3). The transmission times to the other sending apparatuses are measured in the same way. Here, the counterclockwise transmission time to nodes L, K, D and C (with node IDs 0, 1, 8 and 9, respectively) are "6110", "5300", "830" and "420", respectively.

Based on the transmission times in the counterclockwise communication environment obtained at step S12 and the transmission times in the clockwise communication environment obtained at step S10, the control CPU 20 of the granting apparatus A generates a transmission time comparison table as illustrated in FIG. 3 (step S13). Specifically, the control CPU 20 of the granting apparatus A generates the transmission time comparison table by associating clockwise and counterclockwise transmission times in each of the communication environment with the node IDs. The control CPU 20 of the granting apparatus A stores the generated comparison table in the memory 30.

The control CPU 20 of the granting apparatus A then determines a transfer direction for each sending apparatus on the basis of the comparison table (step S14). Specifically, the control CPU 20 of the granting apparatus A chooses the clockwise or counterclockwise transfer direction in which data will be transmitted in shorter (shortest) transmission time for each sending apparatus. For example, for node L with node ID 0, the clockwise transmission time is "10" whereas the counterclockwise transmission time is "6110", and therefore the clockwise transfer direction is selected (see the highlighted cell in FIG. 3). Likewise, the clockwise transfer direction is selected for node K (with node ID 1) and the counterclockwise transfer direction is selected for node H (with node ID 4), node D (with node ID 8), and node C (with node ID 9). The control CPU 20 of the granting apparatus A adds information indicating the selected transfer directions to the comparison table and stores the resulting comparison table in the memory 30.

Figure 9:
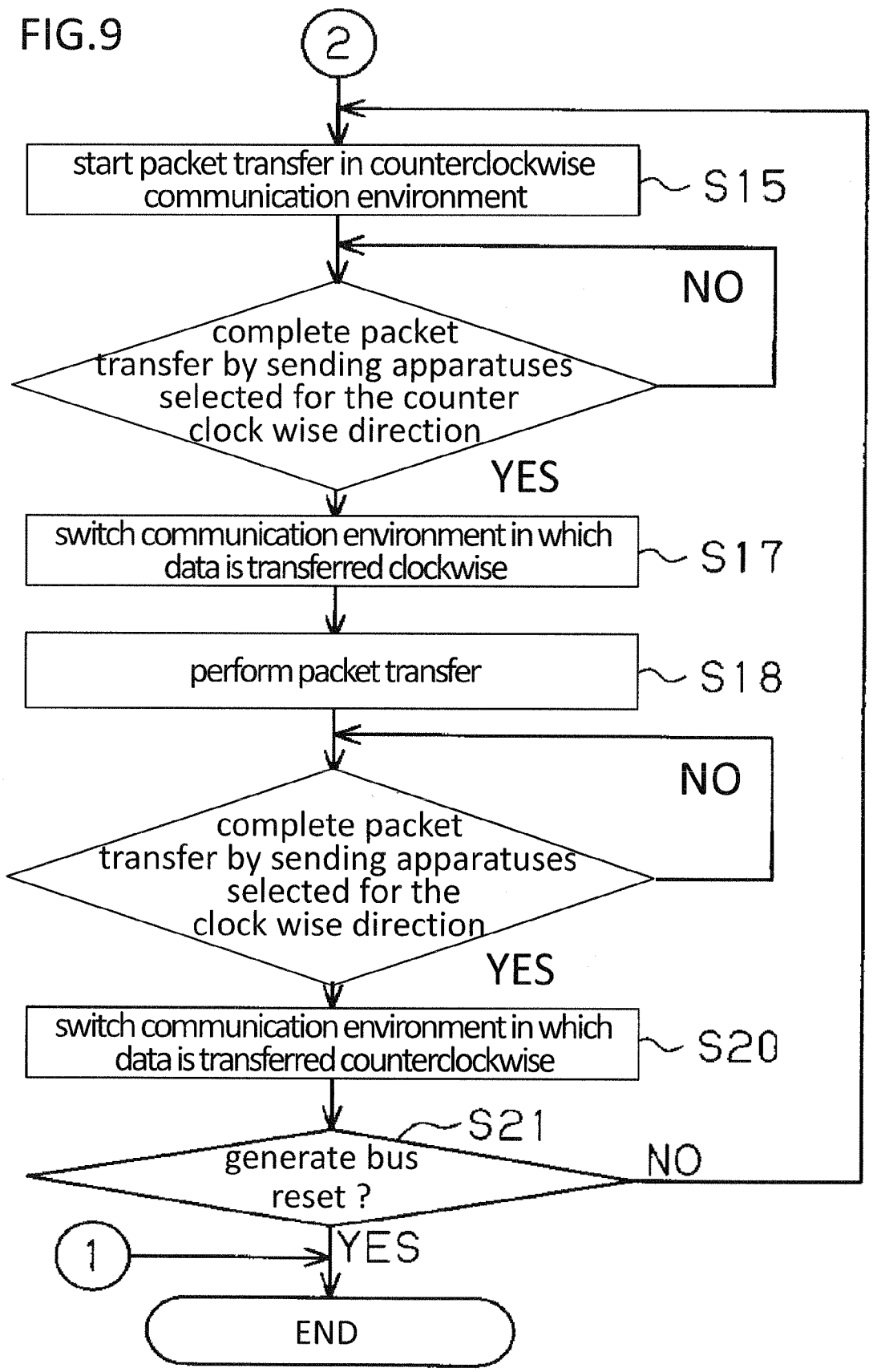
FIG. 9 is a flowchart illustrating packet transfer according to the present embodiment.

Then, at step S15 of FIG. 9, packet transfer in the counterclockwise communication environment is started first. Prior to actual packet transfer, bus arbitration is always performed in order that one of the sending apparatuses that performs packet transfer gains control of the bus. In the bus arbitration, all sending apparatuses that perform packet transfer (nodes C, D, H, K and L in FIG. 6A) send a request signal RS for requesting the control of the bus to the granting apparatus A. The request signal RS from node C arrives at the granting apparatus A first (see the solid-line arrow in FIG. 6A). The granting apparatus A grants the first request signal RS arriving at the granting apparatus A, which is the request signal RS from node C, and sends a grant signal AS for granting the control of the bus to node C (see the solid-line arrow in FIG. 6A). Node C, which has thus won the bus arbitration and has gained the control of the bus, initiates actual packet transfer (see FIG. 7). The granting apparatus A sends a packet indicating that the bus request has been rejected to the nodes that have lost the arbitration (here, nodes D, H, K and L).

Upon completion of packet transfer by node C, the control CPU 20 of the granting apparatus A determines, on the basis of the information indicating the selected directions that was added to the comparison table, whether or not packet transfer by the sending apparatuses selected for the counterclockwise direction have been completed (step S16). Here, since nodes D and H, in addition to node C, have been selected as sending devices for the counterclockwise direction (see FIG. 3), packet transfer in the counterclockwise communication environment is continued (No at step S16) until packet transfer by nodes D and H is completed. Specifically, after the end of packet transfer by node C, all remaining nodes D, H, K and L that perform packet transfer wait a predetermined idle time period and then send a request signal RS to the granting apparatus A as illustrated in FIG. 7. The granting apparatus A grants the first request signal RS arriving at the granting apparatus A, which is the request signal RS from node D, and sends a grant signal AS to node D (see the alternate long-and-short-dashed-line arrow in FIG. 5A). Node D, which has granted the control of the bus, starts actual packet transfer (see FIG. 7). After the end of packet transfer by node D, all remaining nodes H, K and L that perform packet transfer wait the predetermined idle time period and then send a request signal RS to the granting apparatus A. The granting apparatus A grants the first request signal RS arriving at the granting apparatus A, which is the request signal RS from node H, and sends a grant signal AS to node H (see the chain-double-dashed-line arrow in FIG. 6A). Then node H starts packet transfer (see FIG. 7).

With completion of the packet transfer by node H, packet transfer by all the sending apparatuses selected for the counterclockwise direction ends (YES at step S16) and then the process proceeds to step S17. At step S17, the control CPU 20 of the granting apparatus A changes the logical break point in order to switch the communication environment from the counterclockwise to clockwise. Specifically, the control CPU 20 of the granting apparatus A forcibly disables the port circuit 11 of the own node A that differs from the disabled port circuit 12 and enables the port circuit 12. As a result, a communication environment is formed in which only the connection between nodes A and B (bus cable 1A) is logically broken and transfer from the granting apparatus A to the sending apparatuses becomes clockwise as illustrated in FIG. 6B.

In the clockwise communication environment thus formed as in the counterclockwise communication environment, packet transfer is performed until packet transfer by the sending apparatuses selected for the clockwise direction (nodes L and K in this example) is completed (steps S18 and S19). Specifically, after the end of packet transfer by node H as described above, all nodes L and K that perform packet transfer wait a predetermined idle time period and then send a request signal RS to the granting apparatus A. Then the granting apparatus A grants the first request signal RS arriving at the granting apparatus A, which is the request signal RS from node L, and sends a grant signal AS to node L (See the solid-line arrows in FIG. 6B). Then node L that has been granted the control of the bus starts actual packet transfer (see FIG. 7). After the end of the packet transfer by node L, node K waits a predetermined idle time period and then sends a request signal RS from node K to the granting apparatus A. The granting apparatus A grants the first request signal RS arriving at the granting apparatus A, which is the request signal RS from node K, and sends a grant signal AS to node K (see the alternate-long-and-short-dashed-line arrow in FIG. 5B).

In response to this, node K starts packet transfer (see FIG. 7). With completion of the packet transfer by node K, the packet transfer by all the sending apparatuses selected for the clockwise direction ends (YES at step S19) and the process proceeds to step S20.

In packet transfer in a conventional network system, the transfer direction is fixed according to the position of a logical break point automatically selected. For example, in the network system illustrated in FIG. 12, the connection between nodes A and L is automatically selected and logically broken and node A is determined as the granting apparatus. Accordingly, packet transfer from the granting apparatus A to the sending apparatuses is permitted in the fixed, counterclockwise direction only. When nodes (sending apparatuses) C, D, H, K and L attempt to transfer packets in the conventional network system as in the network of the present embodiment, the nodes perform packet transfer in turn in ascending order of distance from the granting apparatus A (that is, nodes C, D, H, K and L perform packet transfer in this order) as illustrated in FIG. 7B. The time requested for packet transfers by nodes C, D and H (the time requested for bus arbitration) is the same as those in the network system of the present embodiment. However, since the distances from nodes K and L to the granting apparatus A (logical connection distances) in the conventional network system are longer than the distances in the network system of the present embodiment, it takes more time to send and receive request signals RS and grant signals AS (bus arbitration) between them accordingly. Specifically, as illustrated in FIG. 3, the transmission times to nodes K and L in the counterclockwise communication environment are "5300" and "6110", respectively. Thus, it takes more time to complete bus arbitration. Accordingly, the time requested for the entire packet transfer is longer in the conventional communication method.

In contrast, in the communication method in the network system according to the present embodiment, the logical break point is changed so that the transmission time between the granting apparatus and every sending apparatus is minimized. Therefore, if a logical break point automatically selected as in the conventional system (see FIG. 4C) increases the logical connection distance between the granting apparatus and a sending apparatus (nodes K and L in FIGS. 3C and 12) that is at a close physical connection distance to the granting apparatus, a change may be made to reduce the logical connection distance between the sending apparatus and the granting apparatus. That is, when sending apparatuses K and L attempt to transmit packets, the port circuit 11 of the granting apparatus A is disabled to make switching from the counterclockwise to clockwise communication environment, thereby the transmission times to the sending apparatuses K and L may be reduced regardless of the location of the automatically selected break point. Specifically, the transmission times to sending apparatuses K and L, which were "5300" and "6110" in the conventional communication method, may be reduced to "820" and "10", respectively. Accordingly, the time requested for sending and receiving a request signal RS and a grant signal AS (bus arbitration) before packet transfer by the sending apparatuses K and L is shorter than that in the conventional method. Consequently, as may be seen from FIG. 7, the communication method of the present embodiment may reduce the time requested for the entire packet transfer compared with the conventional communication method.

Referring back to FIG. 9, at step S20, the control CPU 20 of the granting apparatus A changes the location of the logical break point in order to switch the communication environment from the clockwise to counterclockwise. Specifically, the control CPU 20 of the granting apparatus A forcibly disables the port circuit 12 of the own node A and enables the port circuit 11 of the own node A to logically break the connection between node A and node L (bus cable 1L) to form the counterclockwise communication environment.

The packet transfer process from step S15 through S20 is repeated until a bus reset occurs due to addition of a new node or other reasons (NO at step S21). When a bus reset occurs (YES at step S21), the process from step S1 through S21 will end. When the newly built network system includes a ring topology, the process from step S1 through S21 is initiated again. At this time, a node other than node A may act as the granting apparatus or node A may act as the granting apparatus again.

The embodiment described above has the following advantageous effects.

(1) The time requested for transmission between the granting apparatus A and each of the sending apparatuses C, D, H, K and L is measured in both of the clockwise and counterclockwise communication environments. Based on the measured transmission times, the logical break point is changed prior to packet transfer so that the time requested for transmission between the granting apparatus A and each sending apparatus is minimized. Therefore, packet transfer may be performed in the communication environment in which the transmission time between the granting apparatus A and each sending apparatus is the shortest, regardless of the order in which apparatuses have been powered on and the connection modes of the apparatuses (the positional relationship between the granting apparatus and the automatically selected logical break point). Accordingly, the time requested for sending and receiving a request signal RS and a grant signal AS (bus arbitration) between the granting apparatus and each sending apparatus may be minimized. Since the bandwidth of the network is efficiently used in this way, the bandwidth that may be used for transferring actual packet data is increased and therefore additional packet data may be transmitted.

(2) The granting apparatus A sends a Ping packet to the sending apparatuses to measure the time requested for transmission to each of the sending apparatus. Since the transmission time to each sending apparatus is measured by actually sending a packet, the transmission time may be measured more accurately. Furthermore, since the transfer direction is chosen for each sending apparatus on the basis of the measured transmission time to that sending apparatus, the transfer direction that reduces the transmission time may be reliably chosen.

(Alternative Embodiments)

Modifications may be made to the embodiment described above as appropriate as follows.

Figure 11:
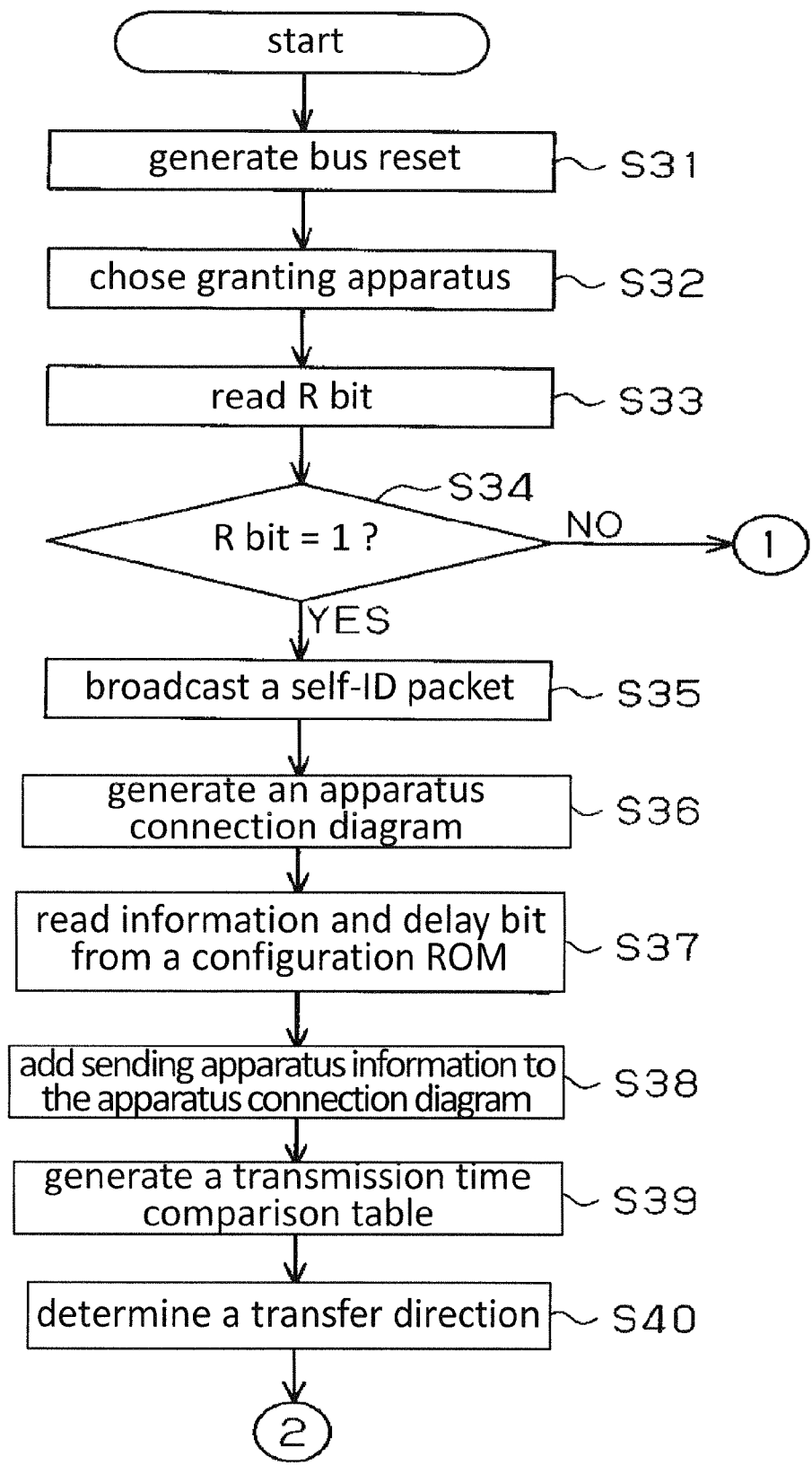
FIG. 11 is a flowchart illustrating an operation of a network system in a variation.

While the time that elapses between transmission of a Ping packet PP and the return of a response packet RP responding to the Ping packet PP is measured to calculate the time requested for transmission between the granting apparatus and each sending apparatus in the embodiment described above, the method for calculating the transmission time is not limited to this. For example, the time it takes for each node to repeat a packet may be acquired to calculate the transmission time between the granting apparatus and each sending apparatus, as illustrated in FIG. 10. A process for acquiring the repeat time in a network system is shown in the flowchart of FIG. 11. Steps S31 through S40 of FIG. 11 replace step S1 through S14 of FIG. 8.

Steps S31 through S36 of FIG. 11 are substantially the same as steps S1 through S6 of FIG. 8 described above. At step S37, the control CPU 20 of the granting apparatus A reads information from a configuration ROM at each of the other nodes and a Delay bit from a register 13a (see FIG. 2) at each of the other nodes. In particular, the control CPU 20 of the granting apparatus A sends a read request packet to the node ID of each of the other nodes to read information from the configuration ROM and Delay bit of the intended node. Here, the control CPU 20 acts as acquisition means for acquiring repeat time. The Delay bit specifies the repeat time of the node. That is, the Delay bit specifies the time (repeat time) it takes for a node to transfer received packet data that is not directed to the node to another node that differs from the node that has sent the packet data. For example, the Delay bit of node B specifies the time (repeat time) it takes for node B to repeat a request signal RS received from node C to node A when node B receives the request signal RS directed to the grating apparatus A from node C (see FIG. 6A for example).

Then, at step S38, the control CPU 20 of the granting apparatus A adds sending apparatus information read from the configuration ROMs to an apparatus connection diagram as in step S8 described earlier. Thus, the control CPU 20 of the granting apparatus A may acquire the positional information indicating the location of the sending apparatuses.

Then the control CPU 20 of the granting apparatus A generates a comparison table containing the transmission times of the nodes as illustrated in FIG. 10, on the basis of the generated apparatus connection diagram and the Delay bits (step S39). Specifically, the control CPU 20 calculates the time requested for transmission from each sending apparatus to the granting apparatus A in each of the clockwise and counterclockwise communication environments from the positional information indicating the location of the sending apparatuses and the repeat times. A method for calculating the transmission time for node H will be described below with reference to FIGS. 4A and 4B.

When node H sends data to the granting apparatus A in the clockwise communication environment illustrated in FIG. 5A, nodes I, J, K and L repeat the data. Therefore, the time requested for transmission from node H to the granting apparatus A may be calculated by adding the amounts of the repeat times at nodes I, J, K and L and the amounts of the transmission times between the nodes through bus cables (the transmission time between two adjacent nodes is "5" in this example). Since the repeat time at each of nodes I, J, K and L is "400" as indicated in FIG. 10, the clockwise transmission time for node H is 1625 (=5+400+5+400+5+400+5+400+5).

Information about the nodes located between node H and the granting apparatus A may be acquired from the apparatus connection diagram generated at step S38 described above.

On the other hand, when node H sends data to the granting apparatus A in the counterclockwise communication environment illustrated in FIG. 5B, nodes G, F, E, D, C and B repeat the data. Therefore, the time requested for transmission from node H to node A may be calculated by adding the amounts of the repeat times at nodes G, F, E, D, C and B and the amounts of the transmission times between the nodes through bus cables (the transmission time between two adjacent nodes is "5" in this example). Since the repeat time at each of nodes G, F, E, D, C and B is "200" as indicated in FIG. 10, the counterclockwise transmission time for node H is 1435 (=5+200+5+200+5+200+5+200+5+200+5+200+5).

The clockwise and counterclockwise transmission times are calculated for each of the other sending apparatuses and the transmission time comparison table illustrated in FIG. 10 is generated.

Then, based on the comparison table, the control CPU 20 of the granting apparatus A chooses a transfer direction for each sending apparatus (step S40). Specifically, the control CPU 20 of the granting apparatus A chooses the clockwise or counterclockwise transfer direction, whichever provides shorter transmission time (fastest transmission) for each sending apparatus. For node L with node ID 0, for example, the clockwise transfer time is "5" whereas the counterclockwise transfer time is "3055". Therefore the clockwise transfer direction is chosen for node L (see the highlighted cell in FIG. 10). Likewise, the clockwise transfer direction is chosen for node K (with node ID 1) and the counterclockwise transfer direction is chosen for node H (with node ID 4), node D (with node ID 8), and node C (with node ID 9).

With this configuration, the transmission times may be accurately calculated because it is calculated by taking into account different repeat times on different nodes. As in the case of node H described above, while the number of nodes located between a node and the granting apparatus A in the clockwise communication environment is smaller than that in the counterclockwise communication environment, actual transmission time in the counterclockwise communication environment may be shorter than in the clockwise communication environment. By calculating the transmission time by taking into account the repeat time at each of the nodes, the transfer direction that provides the shortest transmission time may be accurately chosen. Furthermore, since data such as a Ping packet PP does not need to be sent to each sending apparatus when the transmission time is calculated, the logical break point does not need to be actually changed. The transmission time from each sending apparatus to the granting apparatus may be calculated from the apparatus connection diagram and repeat time information alone.

While the transmission times of each sending apparatus in the clockwise and counterclockwise communication environments are calculated and compared with each other to determine the transfer direction for the sending apparatus in the embodiments described above, the method for determining the transfer direction is not limited to this. For example, the transfer direction for each sending apparatus may be chosen on the basis of the number of repeats performed during data transfer between the granting apparatus and the sending apparatus. In this case, steps S9 through S12 of FIG. 8 are omitted, for example. At step S13, the control CPU 20 of the granting apparatus A generates a table for comparing the repeat counts for each sending apparatus as illustrated in FIG. 12 on the basis of the apparatus connection diagram generated at step S8. Specifically, the number of repeats performed during data transmission between the granting apparatus and each sending apparatus in each of the clockwise and counterclockwise communication environments is calculated from the apparatus connection diagram. Referring to FIGS. 4A and 4B, a method for calculating the number of repeats for node H will be described below.

When node H sends data to the granting apparatus A in the clockwise communication environment illustrated in FIG. 5A, the data is repeated by nodes I, J, K and L. When the granting apparatus A sends data to node H, the data is repeated by nodes L, K, J and I. Therefore the number of repeats in the clockwise transfer for node H is 8. Information about the nodes located between node H and the granting apparatus A may be acquired from the apparatus connection diagram described above.

On the other hand, when node H sends data to the granting apparatus A in the counterclockwise communication environment illustrated in FIG. 5B, the data is repeated by nodes G, F, E, D, C and B. When the granting apparatus A sends data to node H, the data is repeated by nodes B, C, D, E, F and G. Therefore the number of repeats in the counterclockwise transfer for node H is 12.

The number of repeats in each of the clockwise and counterclockwise directions is calculated for the other sending apparatuses and the table for comparing the repeat counts illustrated in FIG. 12 is generated.

Then, at step 14 of FIG. 8, the control CPU 20 of the granting apparatus A determines the transfer direction for each sending apparatus on the basis of the comparison table. Specifically, the control CPU 20 of the granting apparatus A chooses for each sending apparatus one of the clockwise and counterclockwise directions in which the number of repeats is fewer. Here, the clockwise transfer direction is chosen for node L (with node ID 0), node K (with node ID 1), and node H (with node ID 4); the counterclockwise transfer direction is chosen from node D (with node ID 8) and node C (with node ID 9) (see the highlighted cells in FIG. 12). By transferring packets in the chosen direction, the total number of repeats at all sending apparatuses C, D, H, K and L may be minimized to 16 (=2+4+8+2+0). In a conventional network system, as illustrated in FIG. 12, the total number of repeats at all sending apparatuses C, D, H, K and L is 56 (=2+4+12+18+20).

By changing the transfer direction for each sending apparatus based on the number of repeats in this way, the number of repeats performed during packet transfer and the time requested for bus arbitration may be reduced. Furthermore, since data such as a Ping packet PP does not need to be sent to each sending apparatus when the number of repeats is calculated, the logical break point does not need to be actually changed. The number of repeats of each sending apparatus may be calculated from only the information in the apparatus connection diagram generated at step S8.

While the numbers of repeats performed during data transmission (in both directions) between the granting apparatus and the sending apparatus are compared with each other in the foregoing, the numbers of repeats performed in data transmission (in one direction) from the sending apparatuses to the granting apparatus may be compared with each other. The number of nodes located between each sending apparatus and the granting apparatus may be considered as the number of repeats.

The transmission times (repeat count) comparison table is generated separately from the apparatus connection diagram in the embodiments described above. However, transmission times (repeat counts) in each communication environment may be added to the apparatus connection diagram to generate the transmission time (repeat count) comparison table, for example.

While the transmission time for each sending apparatus in the clockwise communication environment is measured and then the transmission time for each sending apparatus in the counterclockwise communication environment is measured in the embodiments described above, the order of measurement is not limited to this.

Since the counterclockwise communication environment has been formed at step S11 of FIG. 8 (see FIG. 5B) in the embodiments described above, the counterclockwise communication environment is used first to initiate and continue packet transfer until completion, then the clockwise communication environment is formed and the packet transfer is performed in the clockwise communication environment (steps S15 through S19 of FIG. 9). However, packet transfer may be performed in the clockwise communication environment first and then in the counterclockwise communication environment.

The number of nodes connected onto the network in the embodiments described above is not limited. Any number of nodes may be included in a ring topology.

While two port circuits 11 and 12 are provided on a single IPC 10 in the embodiments described above, three or more port circuits may be provided on a single IPC 10.

While nodes A to L are implemented as apparatuses conforming to the IDB-1394 standard in the embodiment described above, the nodes may be any apparatuses that conform to a serial interface standard that enables apparatus to be connected in a ring topology. For example, nodes A to L may be implemented as nodes conforming to the IEEE 1394b-2002 standard on which the IDB-1394 standard is based.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A data communication method in a network including a plurality of communication apparatuses connected in the form of a ring, the method comprising:
   calculating transmission time between a sending apparatus and a granting apparatus, which grants control of a bus to the sending apparatus, in each of a first communication environment in which data is transferred in a first direction on the network by disabling a first port circuit of the granting apparatus for transferring the data in a second direction and a second communication environment in which data is transferred in the second direction by disabling a second port circuit of the granting apparatus for transferring the data in the first direction, the second direction being different from the first direction; and
   changing a transfer direction on the network based on the calculated transmission times so that a time interval between a transmission of the data from the sending apparatus to a reception of the data at a destination communication apparatus is minimized,
   wherein, in the calculating transmission time, the granting apparatus sends a packet to the sending apparatus in each of the first and second communication environments and measures a time between the sending of the packet and the arrival of a response packet to calculate the transmission time in each of the first and second communication environments.

2. The data communication method according to claim 1, wherein the transfer direction in which data is transferred on the network is changed by disabling a port that forms the ring among ports of the granting apparatus to change the position at which the network is logically broken.

3. The data communication method according to claim 1, wherein the calculating transmission time comprises:
   forming the first communication environment by disabling the first port circuit;
   calculating by the granting apparatus the transmission time in the first communication environment by sending a packet to the sending apparatus in the first communication environment and measuring the time between the sending of the packet and the arrival of a response packet in response to the packet at the granting apparatus;
   switching from the first communication environment to the second communication environment by enabling the first port circuit and disabling the second port; and
   calculating by the granting apparatus the transmission time in the second communication environment by sending a packet to the sending apparatus in the second communication environment and measuring the time between the sending of the packet and arrival of a response packet in response to the packet at the granting apparatus.

4. The data communication method according to claim 1, wherein the calculating transmission time comprises:
   acquiring repeat time interval at each of the plurality of communication apparatuses, the repeat time interval being the time for repeating a packet in the each of the plurality of communication apparatuses; and
   calculating the transmission time in the first communication environment on the basis of connection mode information indicating a connection mode of the communication apparatuses in the first communication environment and the repeat time interval and calculating the transmission time in the second communication environment on the basis of connection mode information indicating a connection mode of the communication apparatuses in the second communication environment and the repeat time interval.

5. The data communication method according to claim 4, wherein the transmission time in the first communication environment is calculated on the basis of connection mode information in the first communication environment, positional information indicating the position of the sending apparatus, and the repeat time interval at a communication apparatus located between the sending apparatus and the granting apparatus in the first communication environment; and
   the transmission time in the second communication environment is calculated on the basis of connection mode information in the second communication environment, positional information indicating the position of the sending apparatus, and the repeat time interval at a communication apparatus located between the sending apparatus and the granting apparatus in the second communication environment.

6. The data communication method according to claim 1, further comprising:
   comparing the calculated transmission time in the first communication environment with the calculated transmission time in the second communication environment to select one of the first and second transfer directions that provides a shorter transmission time,
   wherein the transfer direction on the network is switched to one of the first and second transfer direction on the basis of information indicating the selected transfer direction.

7. The data communication method according to claim 6, wherein the transferring data comprises:
   forming the first communication environment by disabling the first port circuit;
   transferring data by all of sending apparatuses for which the first transfer direction is selected;
   switching from the first communication environment to the second communication environment by enabling the first port circuit and by disabling the second port circuit; and
   transferring data by all of sending apparatus for which the second transfer direction is selected.

8. A data communication method in a network including a plurality of communication apparatuses connected in the form of a ring, the method comprising:

calculating a number of repeats during data transfer between a sending apparatus and a granting apparatus, which grants control of a bus to the sending apparatus, in each of a first communication environment where data is transferred in a first direction on the network by disabling a first port circuit of the granting apparatus for transferring the data in a second direction and a second communication environment where is transferred in the second direction by disabling a second port circuit of the granting apparatus for transferring the data in the first direction, the second direction being different from the first direction, the number of repeats repeating a packet in the each of the plurality of communication apparatuses; and changing the transfer direction on the network based on the calculated numbers of repeats for minimizing the number of repeats.

9. A communication apparatus acting as a granting apparatus on a network including a plurality of communication apparatuses connected in the form of a ring, the communication apparatus comprising:

a calculator configured to calculate one of transmission time and a number of repeat transmission between a sending apparatuses and a granting apparatus, which grants control of a bus to the sending apparatus, in each of a first communication environment where data is transferred in a first direction on the network by disabling a first port circuit of the granting apparatus for transferring the data in a second direction and a second communication environment where data is transferred in the second direction by disabling a second port circuit of the granting apparatus for transferring the data in the first direction, the second direction being different from the first direction on the network; and a switch configured to change the transfer direction on the network based on the calculated transmission times so that one of a transmission time and a number of repeat transmission for the sending apparatus is minimized, wherein the calculator sends a packet for measuring transmission time to the sending apparatus in the first and second communication environments and measures the time between the sending of the packet and the arrival of a response packet in response to the packet at the granting apparatus to calculate the transmission time in each of the first and second communication environments.

10. The communication apparatus according to claim 9, wherein the switch changes the transfer direction in which data is transferred on the network by disabling a port that forms the ring among ports of the granting apparatus to change the position at which the network is logically broken.

11. The communication apparatus according to claim 9, further comprising an acquisitor for acquiring repeat time at each of the plurality of communication apparatuses; wherein, the calculator calculates the transmission time in the first communication environment on the basis of connection mode information indicating a connection mode of the communication apparatuses in the first communication environment and the repeat time and calculates the transmission time in the second communication environment on the basis of connection mode information indicating a connection mode of the communication apparatuses in the second communication environment and the repeat time.

12. The communication apparatus according to claim 11, further comprising an apparatus connection diagram generator for generating an apparatus connection diagram indicating a connection mode of each of the communication apparatuses on the basis of a self-ID packet sent from each of the communication apparatuses after the network is built; wherein, the acquisitor acquires positional information indicating a position of the sending apparatus by reading apparatus information of each of the plurality of communication apparatuses; and the calculator calculates the transmission time in the first communication environment on the basis of the apparatus connection diagram, the positional information indicating the position of the sending apparatus, and the repeat time at a communication apparatus located between the sending apparatus and the granting apparatus in the first communication environment, and calculates the transmission time in the second communication environment on the basis of the apparatus connection diagram, the positional information indicating the position of the sending apparatus, and the repeat time at a communication apparatus located between the sending apparatus and the granting apparatus in the second communication environment.

13. The communication apparatus according to claim 9, further comprising:

a selector for comparing the calculated transmission time in the first communication environment with the calculated transmission time in the second communication environment to select one of the first and second transfer directions that provides shorter transmission time, wherein the switch changes the transfer direction on the network to the first direction or the second direction on the basis of information indicating the transfer direction selected by the selector.

* * * * *